A. P. HAZARD.

Shoe-Makers' Edge-Plane.

No. 9,167. Reissued April 20, 1880.

Witnesses.
Geo. H. Pierce
E. B. Fairchild

Inventor.
A. P. Hazard.
by Wright & Brown
Attys.

N. PETERS, PHOTO-LITHOGRAPHER, WASHINGTON, D. C.

UNITED STATES PATENT OFFICE.

ARTHUR P. HAZARD, OF BROCKTON, MASSACHUSETTS.

SHOE-MAKER'S EDGE-PLANE.

SPECIFICATION forming part of Reissued Letters Patent No. 9,167, dated April 20, 1880.

Original No. 105,452, dated July 19, 1870. Application for reissue filed December 15, 1879.

*To all whom it may concern:*

Be it known that I, ARTHUR P. HAZARD, of Brockton, in the county of Plymouth and State of Massachusetts, have invented certain Improvements in Shoe-Makers' Edge-Planes, of which the following is a specification.

Figures 1, 2, 3, 4:
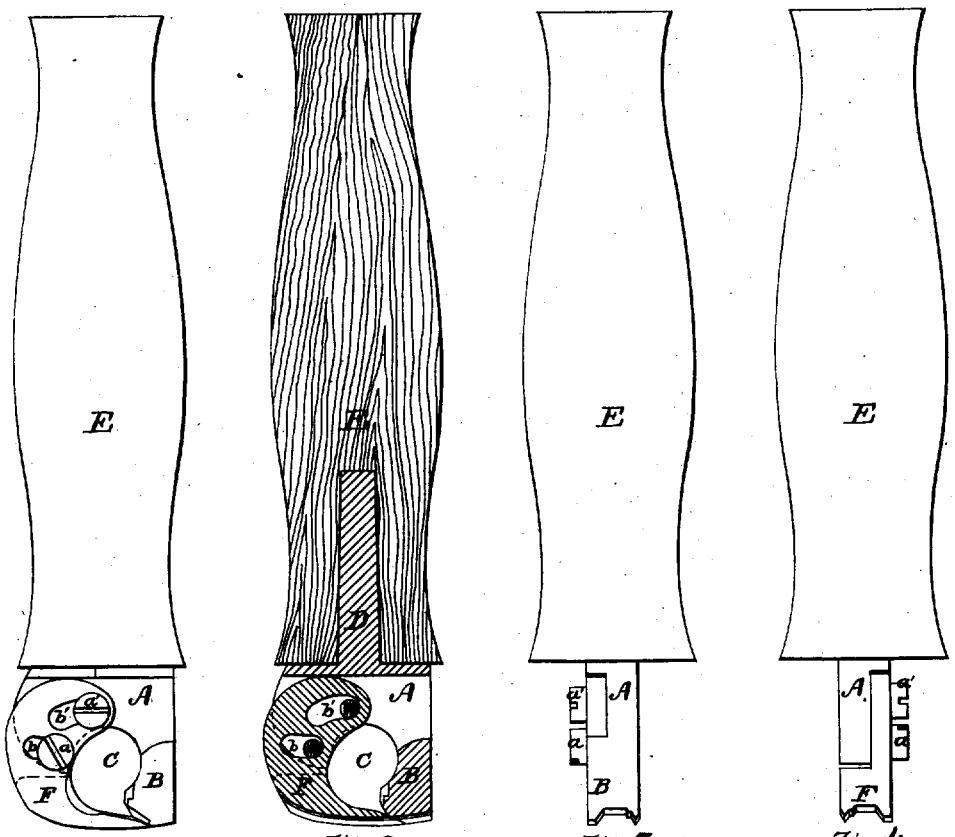
Figure 5:
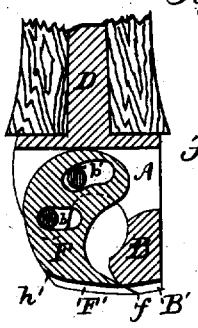
Figure 6:
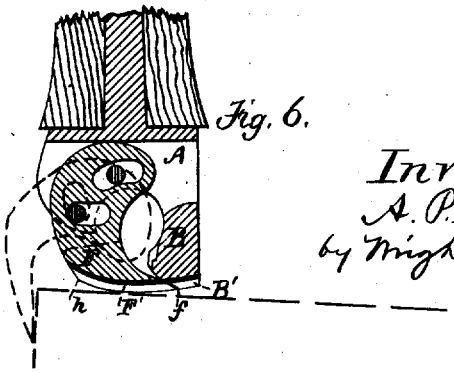

Of the accompanying drawings, forming a part of this specification, Figure 1 represents a side elevation. Fig. 2 represents a longitudinal section. Fig. 3 represents a front-end elevation. Fig. 4 represents a rear-end view of a shoe-maker's edge-plane as constructed in accordance with my invention. Fig. 5 represents a longitudinal section of an edge-plane, showing the cutter moved forward to compensate for wear without being otherwise adjusted; and Fig. 6 represents a section of my improved plane when the cutter is partially worn away and properly adjusted.

My invention relates to that class of devices termed "edge-molding planes," as used by shoe-makers in reducing and molding the edges of boot and shoe soles, in which the molding-edge or bearing-surface of the implement which bears on the edge of the sole is formed in two portions, one of which is on the cutter and the other on the guard.

My invention consists in the provision of means for applying the cutter to the stock in such manner that the cutter, as it becomes worn, may not only have its cutting-edge moved toward the guard to compensate for wear, but also have its molding-surface so adjusted as to maintain its normal or proper relation to the molding or bearing surfaces of the guard, in order that the bearing-surface of the cutter may be practically a continuation of the bearing-surface of the guard, or, in other words, that said surfaces together may present a practically-continuous curve without an angle at the meeting-point of the bearing-surfaces of the cutter and the guard, (the cutting-edge of the cutter being at said meeting-point.)

It is a fact well known that in edge-molding planes as made with a guard and detachable knife no adequate means have been provided by which the cutter and its molding-surface, as the former became worn, could be accurately adjusted to preserve its due correspondence with the guard and its curved molding-surface; but as the cutter became more or less worn, and was moved toward the guard, an obtuse angle was formed at the meeting-point of the bearing-surfaces of the cutter and guard—that is to say, the bearing-surface of the cutter became inclined with reference to the bearing-surface of the guard in proportion to the extent of the movement of the cutter. Hence it has been necessary heretofore, after moving the cutter forward to readjust the bearing-surface of the guard, to make the curve of said surface a continuation of the surface of the cutter, and this adjustment had to be performed by a skilled mechanic.

The object of my invention is to enable the workman who uses the tool to readily adjust the parts and keep them in their due relation until the cutter is worn out without any reconstruction whatever of the parts.

In the drawings, A denotes the stock of the implement, the same being made of a block or piece of steel, and having a guard, B, disposed on its front end. This guard may be formed in one piece with the block, or may be made separate therefrom, and so as to be adjustable thereon and connected thereto in any suitable manner, as may be desirable.

The bottom B′ of the guard is smoothly polished, and constitutes at once a molding and a bearing surface, which rests on the edge of the sole in advance of the cutter.

C denotes the throat of the tool, which extends transversely through the same, as shown in the drawings. D is a tang, which extends down from the stock into the handle E. F is a curved knife or cutter, which is formed as shown in Figs. 1, 2, 3, and 4, and attached to the side of the stock A by means of two screws, *a a′*, which pass through elongated slots *b b″* made in the cutter, and screw into the said stock.

The bottom F′ of the cutter between the cutting-edge *f* and the heel *h* constitutes a curved molding and bearing surface which is practically a continuation of the surface B′ of the guard, the continuity of the two being broken only by the slight space between the cutting-edge *f* and the adjacent end of the surface B′. In other words, the surfaces B′ and F′ do not form an angle at their meeting-point, but form a practically-continuous curve.

My invention looks to the maintenance of this relation of the bearing-surfaces, and to this end the slots *b b'* are made wider than the shanks of the screws, and are so arranged that the cutter can not only be moved forward to bring its edge *f* nearer the guard, but can also be lowered bodily or swung downwardly to lower the heel of the cutter, so as to change the inclination of the surface F'.

By this arrangement of the slots I am enabled to lower the heel *h* when I move the cutter forward, and thereby preserve the continuity of the surfaces B' F', as shown in Fig. 6, instead of causing said surfaces to form an obtuse angle, as would be the case if the cutter were moved forward without being lowered at the heel, as shown in Fig. 5. Hence the surface can be easily and accurately adjusted to operate to the best advantage with the surface of the guard, and so that the two surfaces shall have an extended bearing upon the edge of the sole, whereby the tool is not only firmly supported and enabled to cut an even shaving from the edge, but serves at the same time to more or less condense and polish it.

By my peculiar construction and application of the said knife to the stock the grinding or sharpening of the knife when it has become dulled is an easy operation, as all I have to do is to slightly turn the screw *a* and remove the screw *a'*. The knife turning on the screw *a* as a fulcrum can be readily turned back a sufficient distance to allow the edge to be reduced upon a grindstone.

In adjusting the knife to its proper position with respect to the guard I first bring the scarfed edge of the knife to bear on the inclined surface of the guard and fasten the screw *a*. Next, to adjust the cutting-edge of the knife at the proper distance from the guard, I have simply to raise that part of the knife the desired distance, and next tighten the screw *a'*, and the implement is ready for use.

I do not confine myself to the formation of the slots in the shank of the knife and passing the screws through these into the stock, as I sometimes make the slots in the stock and pass the screws through them into the shank of the knife, in which case the heads of the screws would be on the opposite side of the stock.

I do not claim, in a sole-edge plane, making the knife detachable and adjustable upon its curved shank, as I am aware that such is not new.

I claim as my invention—

1. An edge-plane provided with a stock and with a cutter secured to the side of said stock, in combination with screws *a a'*, passed through slots *b b'*, constructed as shown and described, to hold said cutter in place and permit it to be raised and lowered in said slots to regulate the thickness of shaving.

2. In an edge-plane, the cutter, in combination with the screws *a* and *a'*, arranged in slots *b* and *b'*, constructed as shown, whereby the cutter may be turned back to be sharpened without removing it from the tool, substantially as specified.

3. The combination and arrangement, substantially as shown, of the stock, the guard, the cutter, and screws *a a'*, passing through slots *b b'*, whereby the cutter may be adjusted to compensate for wear and preserve the original curvature and outline of the working-face of the tool.

ARTHUR P. HAZARD.

Witnesses:
C. F. BROWN,
GEO. W. PIERCE.